United States Patent
Tseng et al.

(10) Patent No.: US 9,438,785 B2
(45) Date of Patent: Sep. 6, 2016

(54) ELECTRONIC DEVICE AND FOCUS ADJUSTMENT METHOD THEREOF

(71) Applicant: HTC Corporation, Taoyuan, Taoyuan County (TW)

(72) Inventors: Fu-Chang Tseng, Taoyuan (TW); Chen-si Dai, Taoyuan (TW); Wan-Ju Tseng, Taoyuan (TW); Wei-Ting Liu, Taoyuan (TW); Jing-Lung Wu, Taoyuan (TW); Yu-Chun Peng, Taoyuan (TW); Hsin-Ti Chueh, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 145 days.

(21) Appl. No.: 13/762,460

(22) Filed: Feb. 8, 2013

(65) Prior Publication Data
US 2013/0235252 A1    Sep. 12, 2013

Related U.S. Application Data

(60) Provisional application No. 61/608,780, filed on Mar. 9, 2012.

(51) Int. Cl.
*H04N 5/232*    (2006.01)

(52) U.S. Cl.
CPC .................................. *H04N 5/23212* (2013.01)

(58) Field of Classification Search
CPC ...................... H04N 5/23212; H04N 5/23219; G03B 13/36; G02B 7/36; G02B 7/28
USPC ........................................................ 348/349
See application file for complete search history.

(56) References Cited

U.S. PATENT DOCUMENTS

| | | | |
|---|---|---|---|
| 2001/0035910 A1* | 11/2001 | Yukawa et al. | 348/349 |
| 2006/0285089 A1* | 12/2006 | Higashi | 353/101 |
| 2007/0177862 A1* | 8/2007 | Terayama et al. | 396/133 |
| 2010/0208088 A1* | 8/2010 | Nakai et al. | 348/208.4 |
| 2011/0085053 A1 | 4/2011 | Lin et al. | |
| 2011/0305446 A1* | 12/2011 | Itoh | G03B 13/36 396/95 |

FOREIGN PATENT DOCUMENTS

TW    201114253    4/2011

OTHER PUBLICATIONS

English translation of summary grounds of rejection of Taiwan Office Action dated Jul. 29, 2014.

* cited by examiner

*Primary Examiner* — Twyler Haskins
*Assistant Examiner* — Fayez Bhuiyan
(74) *Attorney, Agent, or Firm* — McClure, Qualey & Rodack, LLP

(57) ABSTRACT

An electronic device and a focus adjustment method thereof are provided. The electronic device and the focus adjustment method thereof pre-process the image frames captured to provide focus information of the image frames and adjust the focus according to the focus information. Therefore, as the subject followed or the current scene is out of focus in response to movement of the electronic device, the present invention can immediately obtain the change of focus via the focus information and effectively adjust the focus according to the focus information.

24 Claims, 8 Drawing Sheets

ELECTRONIC DEVICE AND FOCUS ADJUSTMENT METHOD THEREOF

This application claims priority to U.S. Provisional Patent Application No. 61/608,780 filed on Mar. 9, 2012, which is hereby incorporated by reference in its entirety.

CROSS-REFERENCES TO RELATED APPLICATIONS

Not applicable.

BACKGROUND OF THE INVENTION

1. Field of the Invention

The present invention relates to an electronic device and a focus adjustment method. More particularly, the present invention relates to an electronic device with a focus adjustment function and a focus adjustment method thereof.

2. Descriptions of the Related Art

Various electronic devices (e.g., conventional mobile phones, smart phones, notebook computers, tablet computers, etc.) have become indispensable to everyday lives of modern people. Almost all electronic device manufacturers have tried to design electronic devices to keep up with consumer needs. Among these designs, combining various image applications with electronic devices has been regarded as a requirement for people over recent years.

The user may capture pictures or record video by use of such electronic devices. In general, the user may move the electronic device to follow certain subject or change the scene before capturing pictures or during recording video so that the subject followed or the current scene may be out of focus. The scene may even change as background condition changes, for example, sun set or sun rise. In these conditions, the electronic device might need to adjust the focus accordingly to keep a good image quality at any time for picture capture or video record.

In view of this, an urgent need exists in the art to provide a better solution to the problem in which the electronic device can not effectively and immediately adjust the focus in response to the subject followed or the current scene being out of focus.

SUMMARY OF THE INVENTION

The primary objective of the present invention is to provide a better solution to the problem in which the conventional electronic devices can not effectively and immediately adjust the focus in response to the subject followed or the current scene being out of focus. The present invention pre-processes the image frames captured to provide focus information of the image frames and adjusts the focus according to the focus information. Therefore, as the subject followed or the current scene is out of focus in response to movement of the electronic device, the present invention can immediately obtain the change of focus via the focus information and effectively adjust the focus according to the focus information.

To achieve the aforesaid objective, the present invention provides an electronic device. The electronic device comprises an image sensor unit comprising at least one lens module, a pre-processing unit coupled with the image sensor unit and an image processing unit coupled with the image sensor unit and the pre-processing unit. The image sensor unit is configured to capture a plurality of image frames of at least one scene. The pre-processing unit is configured to process the image frames to provide focus information of the image frames. The image processing unit is configured to determine a focus change condition of the image frames and adjust the lens module according to the focus information in response to the focus change condition being satisfied.

To achieve the aforesaid objective, the present invention further provides a focus adjustment method for use in an electronic device. The electronic device comprising an image sensor unit comprising at lease one lens module, a pre-processing unit coupled with the image sensor unit and an image processing unit coupled with the image sensor unit and the pre-processing unit. The focus adjustment method comprises the following steps of:

(a) capturing a plurality of image frames of at least one scene by the image sensor unit;

(b) processing the image frames to provide focus information of the image frames by the pre-processing unit;

(c) determining a focus change condition of the image frames by the image processing unit; and (d) adjusting the lens module by the image processing unit according to the focus information in response to the focus change condition being satisfied.

To achieve the aforesaid objective, the present invention further provides another focus adjustment method for use in an electronic device. The focus adjustment method comprises the following steps of:

(a) capturing at least one image frame by an image sensor unit;

(b) determining a focus state and a sharpness value of the image frame by a pre-processing unit; and (c) adjusting an adjustment position of a lens module of the image sensor unit by an image processing unit according to the focus state and the sharpness value.

The detailed technology and preferred embodiments implemented for the subject invention are described in the following paragraphs accompanying the appended drawings for persons skilled in this field to well appreciate the features of the claimed invention.

DESCRIPTION OF THE PREFERRED EMBODIMENT

The present invention can be explained with reference to the following embodiments. However, these embodiments are not intended to limit the present invention to any specific environments, applications or implementations described in these embodiments. Therefore, the description of these embodiments is only for the purpose of illustration rather than to limit the present invention. In the following embodiments and attached drawings, elements not directly related to the present invention are omitted from depiction; and dimensional relationships among individual elements in the attached drawings are illustrated only for ease of understanding but not to limit the actual scale.

Figure 1:
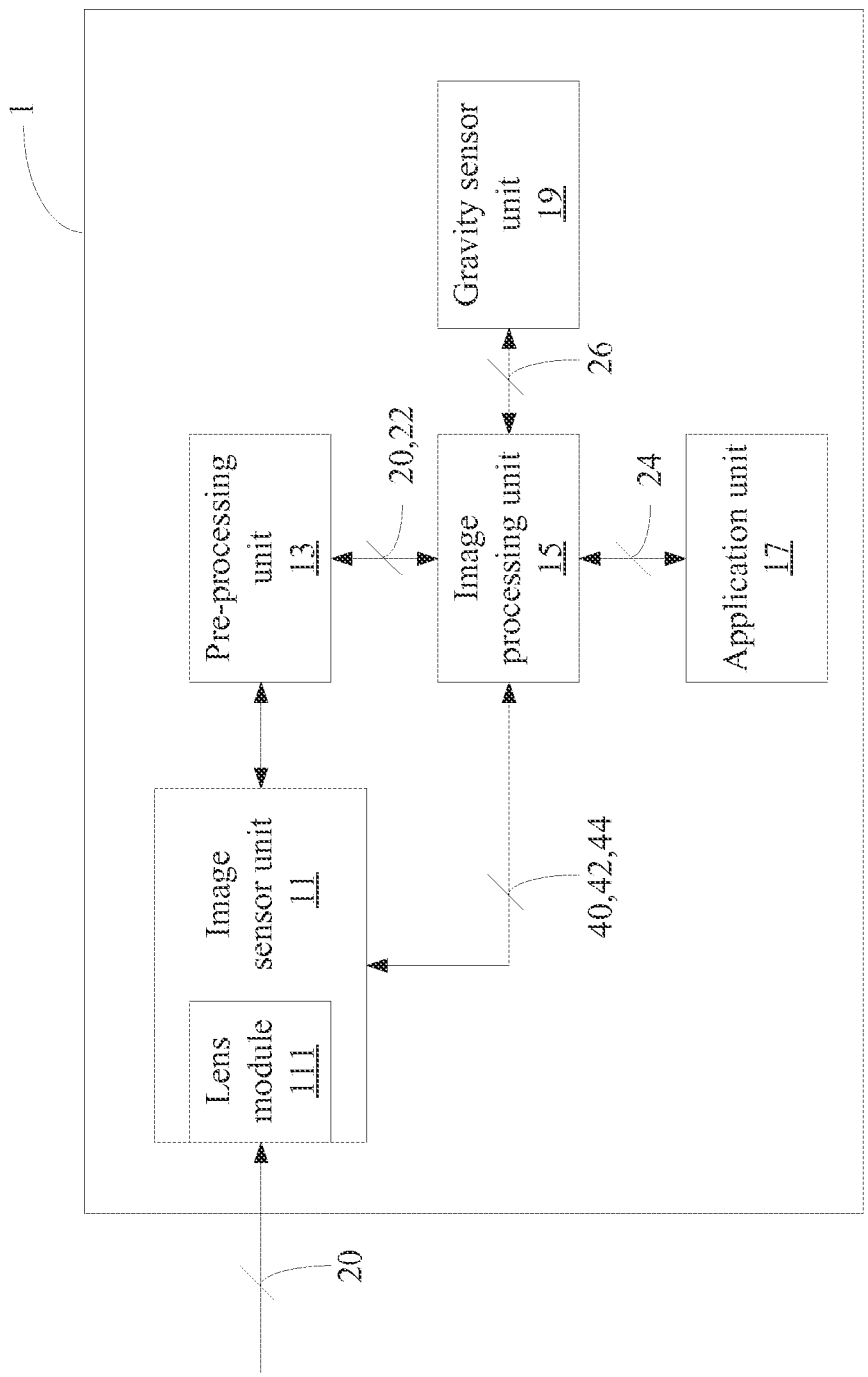
FIG. 1 is a schematic view illustrating an electronic device according to a first embodiment of the present invention.

A first embodiment of the present invention is as shown in FIG. 1, which depicts an electronic device 1 of the present invention. The electronic device 1 may be a smart phone or some other electronic devices with a camera function. For example, the electronic device 1 may also be a notebook computer, a tablet computer, a personal digital assistant (PDA), a digital camera, etc.

As shown in FIG. 1, the electronic device 1 may comprise an image sensor unit 11 comprising at least one lens module 111, a pre-processing unit 13 coupled with the image sensor unit 11 and an image processing unit 15 coupled with the image sensor unit 11 and the pre-processing unit 13. The lens module 111 may be a general lens or a special lens such as an extended depth of filed (EDOF) lens.

The image sensor unit 11 is configured to capture a plurality of image frames 20 of at least one scene (not shown), and transmit the image frames 20 to the pre-processing unit 13. The pre-processing unit 13 is configured to process the image frames 20 which belong to raw image data format to provide the image processing unit 15 with focus information 22 of the image frames 20. The pre-processing unit 13 may performs various operations on the image frames 20 and provides the operation results as a part of the focus information 22. For example, the pre-processing unit 13 may performs a statistic calculation, a sharpness calculation, a focus state determination and/or other operations on the image frames 20.

The pre-processing unit 13 is further configured to pass the image frames 20 to image processing unit 15. Alternatively, the image processing unit 15 may directly derive the image frames 20 from the image sensor unit 11 in other embodiments. Upon receiving the image frames 20, the image processing unit 15 processes the image frames 20 and outputs the image frames processed (not shown) in suitable format for display or image capture. For example, the image processing unit 15 may convert the image frames 20 to RGB image frames.

Optionally, in other embodiments, the electronic device 1 may further comprise an application unit 17 coupled with the image processing unit 15 for processing various different applications. In addition, the image processing unit 15 may further comprise an ROI determination module (not shown) configured to receive predefined region information 24 such as region of interest (ROI) information from the application unit 17, and provide the predefined region information 24 to the pre-processing unit 13.

In general, ROI information indicates a predefined region or designated area of the scene that the user is interested in. In other words, ROI information would contain information that the user cares most. Therefore, the ROI determination module may select an ROI for use in various operations in response to the predefined region information 24. For example, the ROI may be selected as a result of face detection, which might be automatically performed or by a user input of tapping on a face. The ROI may also be predefined at a certain region such as the center region of a scene, or selected by other image processing techniques such as edge detection, to designate a specific region automatically.

Once the ROI is determined, the predefined region information 24, for example coordinates of vertices, starting position and/or size information is sent from the image processing unit 15 to the pre-processing unit 13. Next, the pre-processing unit 13 may calculates the confidence, focus state and/or other status information of the ROI and send them to the image processing unit 15 along with the image frames 20. In this way, the pre-processing unit 13 derives the focus information 22 from a predefined region of the image frames 20 according to the predefined region information 24. That is, the focus information 22 now is limited to focus information of the predefined region of the image frames 20.

The image processing unit 15 is further configured to determine a focus change condition of the image frames 20 and control the lens module 111 according to the focus information 22 in response to the focus change condition being satisfied. The image processing unit 15 may comprise a condition determination module (not shown) configured to determine whether a focus adjustment should be performed by analyzing scene change such as position change of a specified subject and brightness/light condition change of a scene between frames, and determine which adjustment algorithm should be applied.

For example, if the condition determination module determines that the lens module 111 needs not dramatic movement, a first adjustment algorithm may be used to slight adjust the lens module 111. If the condition determination module determines that the lens module 111 needs dramatic movement, a second adjustment algorithm may be used to move the lens module 111 from one end to another. Yet in another case if the condition determination module cannot obtain useful information for focus adjustment, a third adjustment algorithm may be used to perform a full focus scan to recover focus.

Specifically, the condition determination module is configured to determine a focus change condition of the image frames 20. In addition, the focus change condition may be determined as being satisfied by the condition determination module in response to a variance of at least one predetermined characteristic value of at least two consecutive image frames of the image frames 20 exceeding a predetermined threshold. For example, the predetermined characteristic value may be one of a brightness value, a motion value, a sharpness value, etc.

Optionally, in other embodiments, the electronic device 1 may further comprise a gravity sensor unit 19 coupled with the image processing unit 15 for providing gravity sensor values 26. In this way, the focus change condition is determined as being satisfied by the condition determination module in response to a variance of the gravity sensor values over a time period exceeding a gravity sensor value threshold predetermined.

In detail, if a variance of the gravity sensor values over a time period exceeds a gravity sensor value threshold predetermined, it means that the user might move the electronic device 1 to record a different scene or to follow movement of a subject. To avoid misjudge of handshake case, if a variance of the gravity sensor values over a time period is slight, it is determined that the scene does not change from the perspective of the user.

Note that the condition determination module may make decision based on a plurality of criteria in other embodiments, and whenever any one of the criteria is met, it is determined that a focus adjustment should be performed.

Furthermore, the aforesaid types of the focus change condition are only for the purpose of illustration rather than to limit the present invention.

The method in which the image processing unit 15 adjusts the lens module 111 according to the focus information 22 is further described hereinafter. In response to the focus change condition being satisfied, the image processing unit 15 may obtain a first focus state of the current image frame of the image frames 20 according to the focus information 22. Next, the image processing unit 15 determines a first adjustment position of the lens module 111 according to the first focus state. Finally, the image processing unit 15 transmits a first control signal 42 carrying the first adjustment position to the image sensor unit 11 to adjust the lens module 111.

More specifically, upon obtaining first focus state of the current image frame of the image frames 20, the image processing unit 15 determines whether the first focus state of the current image frame is within a focus range of the lens module 111 or not. In general, the lens module 111 has a limited focus range depending on the type of lens. For EDOF lens, it may be able to stay in focus with larger focus range. That means, such lens module 111 needs not to move, or just slightly move its position, still be able to view objects in a wider range. Normally, if an object only moves slightly away, the lens module 111 may still be able to view the object clearly without moving accordingly.

In detail, if the first focus state of the current image frame is within the focus range of the lens module 111, it may be suggested that only minor adjustment with a known adjustment position is required. Thus, the image processing unit 15 determines an optimal adjustment position of the lens module 111 according to a predetermined profile and then transmits a final control signal 40 carrying the optimal adjustment position to the image sensor unit 11 to adjust the lens module 111. For example, if the first focus state is in a linear range, the final control signal 40 indicates that the lens module 111 should be adjusted by an offset in a determined direction. If the first focus state is in a direction range, the final control signal 40 indicates that the lens module 111 should be adjusted by direction.

Otherwise, if the first focus state of the current image frame is out of the focus range of the lens module 111, the image processing unit 15 calculates a first sharpness value of the current image frame and determines a current position value of the lens module 111. Next, the image processing unit 15 determines a first adjustment direction according to the current position value of the lens module 111 and then determines a first adjustment position of the lens module 111 according to the first adjustment direction. The first adjustment position can be a position a predetermined step away from the current position of the lens module 111 in the first adjustment direction. Later, the image processing unit 15 may determine how to adjust the lens module 111 to an optimal position according to the first sharpness value at different positions.

The image processing unit 15 may further comprise a sharpness determination unit (not shown) configured to perform sharpness calculation on the image frames 20 and a lens control module (not shown) configured to transmit a first control signal 42 carrying the first adjustment position to the image sensor unit 11 to adjust the lens module 111. The first adjustment position may imply the information of the adjustment direction and the number of steps per adjustment/movement. In another embodiment of the present invention, the sharpness determination unit may be implemented in the image pre-processing unit 13.

The sharpness determination unit may comprise a high pass filter (HPF) configured to receive the image frames 20 and filter out low frequency components thereof for identifying edge information so as to obtain sharpness values of the image frames 20. The sharpness values of the image frames 20 may be provided to the condition determination unit as well for determining the focus change condition aforementioned.

In general, a sharpness value is proportional to the edge information of the current scene taken by the image sensor unit 11. The larger the sharpness value is, the clearer the edge of the current image frame is. In other words, the larger the sharpness value represents better focus. Therefore, it can be estimated what the current focus distance is according to the current sharpness value, and thus to determined which direction the lens module 111 should be moved.

Figure 2:
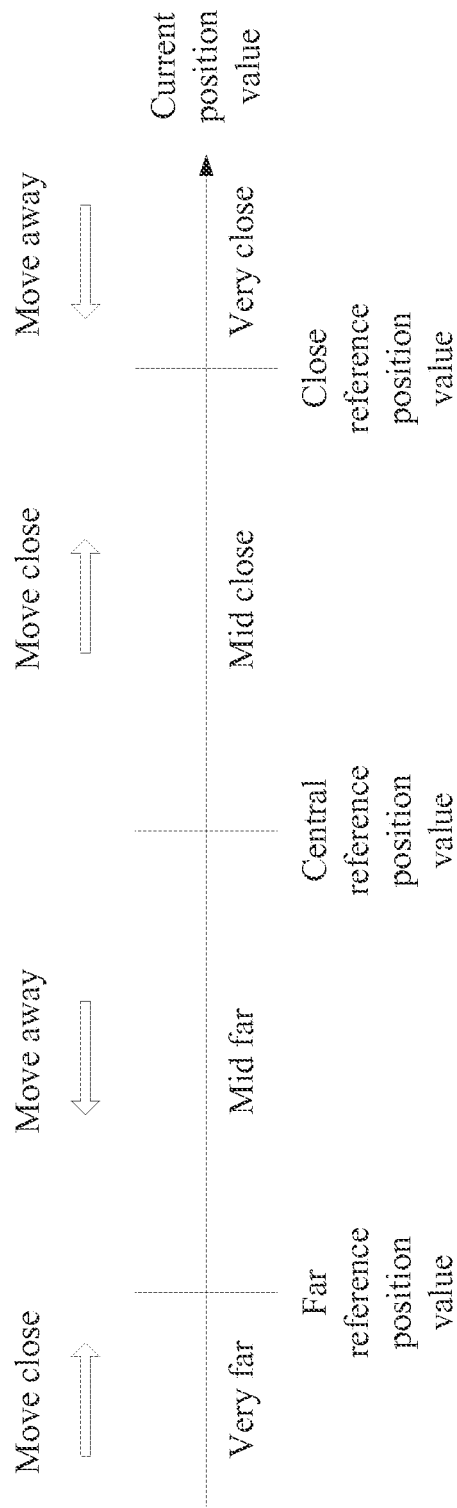
FIG. 2 is a schematic view illustrating an example of the relationship between sharpness values and adjustment directions of the lens module according to the first embodiment of the present invention.

FIG. 2 is a schematic view illustrating an example of the relationship between the current position value and adjustment directions of the lens module 111. As shown in FIG. 2, the lens module 111 may be adjusted close to the current scene taken by the image sensor unit 11 in response to one of the following conditions: the current position value is larger than a far reference position value and the current position value lies within a range between a close reference position value and a central reference position value.

Otherwise, the lens module 111 may be adjusted away from the current scene taken by the image sensor unit 11 in response to one of the following conditions: the current position value is smaller than the close reference position value and the current position value lies within a range between the far reference position value and the central reference position value. Note that the far reference position value, the central reference position value and the close reference position value may be predetermined according to different circumstances.

In detail, if the current position value is larger than the far reference position value, it is suggested that the current scene taken by the image sensor unit 11 may be at very far place. Thus, the lens module 111 should be adjusted close to the scene. On the contrary, if the current position value is smaller than the close reference, it is suggested that the current scene taken by the image sensor unit 11 may be at very close place. Thus, the lens module 111 should be adjusted away from the scene.

Furthermore, in response to that the current position value lies within a range between the close reference position value and the central reference position value, it is assumed that the lens module 111 should be adjusted further close to the scene. In response to that the current position value lies within a range between the far reference position value and the central reference position value, it is assumed that the lens module 111 should be adjusted further away from the scene. Based on the procedures, the lens control unit of the image processing unit 15 may compare the current position value with several predefined thresholds or predefined ranges and determine the first adjustment direction accordingly.

Upon the lens module 111 being adjusted according to the first control signal 42, the next focus state and the next sharpness value of the same image frame is again calculated and compared with the previous sharpness value so as to determine whether the lens module 111 has reached an optimal adjustment position with best focus.

Specifically, the image processing unit 15 may determine a second focus state of the same image frame upon the lens module 111 being adjusted according to the first control signal 42. The image processing unit 15 may determine whether the second focus state is within the focus range of the lens module 111 or not. If the second focus state is within the focus range of the lens module 111, as described earlier, the image processing unit 15 determines an optimal adjustment position of the lens module 111 according to a predetermined profile and then transmits a final control signal 40 carrying the optimal adjustment position to the image sensor unit 11 to adjust the lens module 111.

Otherwise, if the second focus state is out of the focus range of the lens module 111, the sharpness determination unit of the image processing unit 15 calculates a second sharpness value of the same image frame. The procedure in which the image processing unit 15 determines whether the second focus state is within the focus range of the lens module 111 may be omitted in other embodiments, and this will not affects enablement of the present invention.

Upon calculating the second sharpness value, the sharpness determination unit of the image processing unit 15 further compares the second sharpness value with the first sharpness value to determine a second adjustment direction, and then determines a second adjustment position of the lens module 111 according to the second adjustment direction. Finally, the lens control module of the image processing unit 15 transmits a second control signal 44 carrying the second adjustment position to the image sensor unit 11 to adjust the lens module 111.

The second adjustment direction may be determined based on the rule: the second adjustment direction is the same as the first adjustment direction in response to the second sharpness value being larger than the first sharpness value; and the second adjustment direction is opposite to the first adjustment direction in response to the second sharpness value being smaller than the first sharpness value.

In detail, if the second sharpness value is larger than the first sharpness value, it is suggested that the first adjustment direction of the lens module 111 is correct. That is, the lens module 111 is adjusted in correct direction. Thus, it is determined that the second adjustment direction is the same as the first adjustment direction. Otherwise, if the second sharpness value is smaller than the first sharpness value, it is suggested that the first adjustment direction of the lens module 111 is incorrect. That is, the lens module 111 is adjusted in wrong direction. Thus, it is determined that the second adjustment direction is opposite to the first adjustment direction.

The image processing unit 15 is further configured to repeatedly adjust the lens module 111 of the image sensor unit 11 in the same way as described before until an optimal adjustment position of the lens module 111 with best focus is determined. As described earlier, the larger sharpness represents better focus. Thus, the lens control unit of the image processing unit 15 may control the lens module 111 to move step by step and monitor corresponding change of respective sharpness values.

If one of the sharpness values starts to decrease, or the sign of a variance of two consecutive steps changes (from positive to negative), it can be known that a maximum sharpness value may be found. That is, an optimal adjustment position of the lens module 111 with best focus corresponding to the maximum sharpness value may be obtained. Accordingly, the lens control module of the image processing unit 15 transmits a final control signal 40 carrying the optimal adjustment position to the image sensor unit 11 to adjust the lens module 111. Thus, the lens module 111 will be adjusted to the optimal position, and the focus adjustment process may be terminated.

Figure 3:
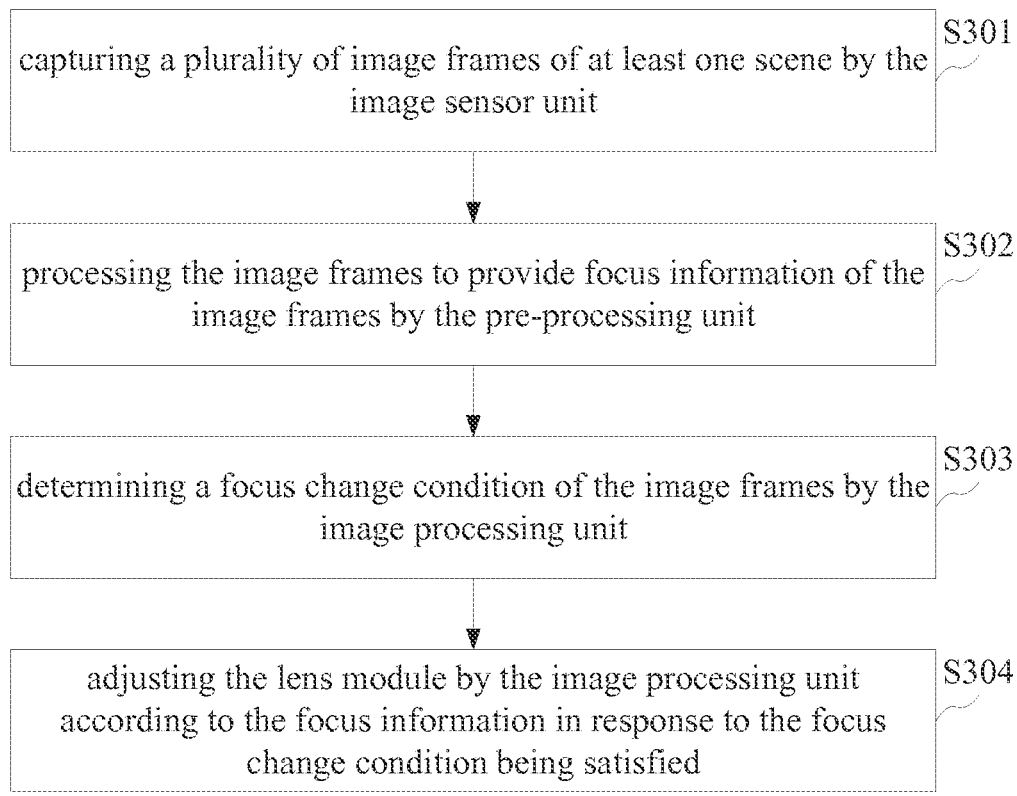
FIG. 3 is a flowchart diagram of a focus adjustment method according to a second embodiment of the present invention.

A second embodiment of the present invention is as shown in FIG. 3, which depicts a focus adjustment method. The focus adjustment method of this embodiment can be applied in an electronic device electronic device which comprises an image sensor unit comprising at lease one lens module, a pre-processing unit coupled with the image sensor unit and an image processing unit coupled with the image sensor unit and the pre-processing unit, e.g., the electronic device 1 of the first embodiment.

As shown in FIG. 3A, step S301 is executed to capture a plurality of image frames of at least one scene by the image sensor unit. Step S302 is executed to process the image frames to provide focus information of the image frames by the pre-processing unit. In other embodiments, the Step S302 may further comprise the step of deriving the focus information from a predefined region of the image frames by the pre-processing unit according to predefined region information provided by the image processing unit.

Step S303 is executed to determine a focus change condition of the image frames by the image processing unit. Step S304 is executed to adjusting the lens module by the image processing unit according to the focus information in response to the focus change condition being satisfied.

Specifically, the focus change condition is determined as being satisfied in response to a variance of at least one predetermined characteristic value of at least two consecutive image frames of the image frames exceeding a predetermined threshold. For example, the predetermined characteristic value may be one of a brightness value, a motion value and a sharpness value, etc.

In other embodiments, the electronic device may further comprises a gravity sensor unit coupled with the image processing unit, and the focus change condition is determined as being satisfied in response to a variance of the gravity sensor values over a time period exceeding a gravity sensor value threshold.

In addition to the aforesaid steps, the focus adjustment method of this embodiment can also execute all the operations of the electronic device 1 set forth in the aforesaid embodiments and accomplish all the corresponding functions. The method in which the focus adjustment method of this embodiment executes these operations and accomplishes these functions can be readily appreciated by those of ordinary skill in the art based on the explanations of the aforesaid embodiments, and thus will not be further described herein.

Figure 4A:
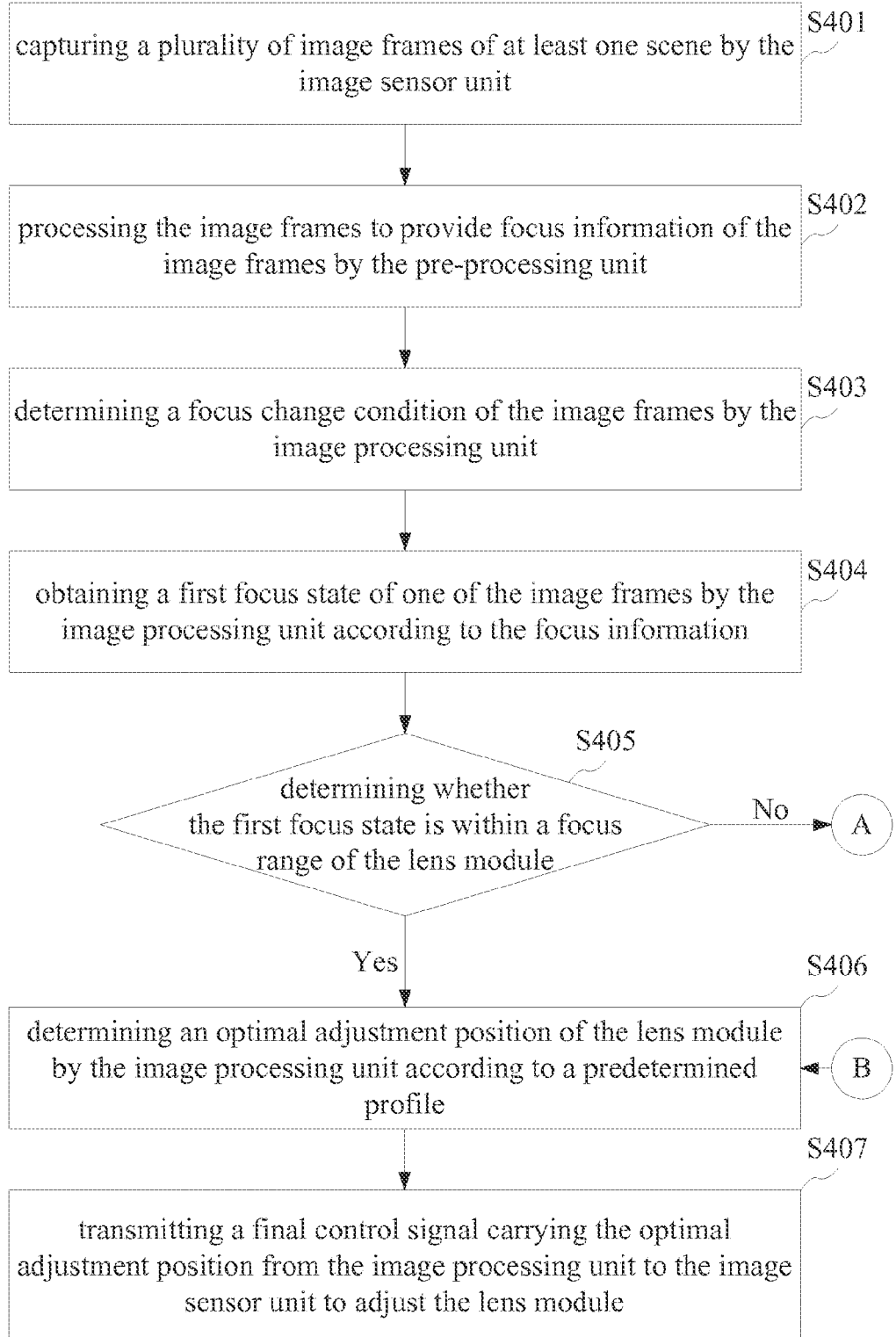
FIGS. 4A-4C is a flowchart diagram of a focus adjustment method according to a third embodiment of the present invention.
Figure 4B:
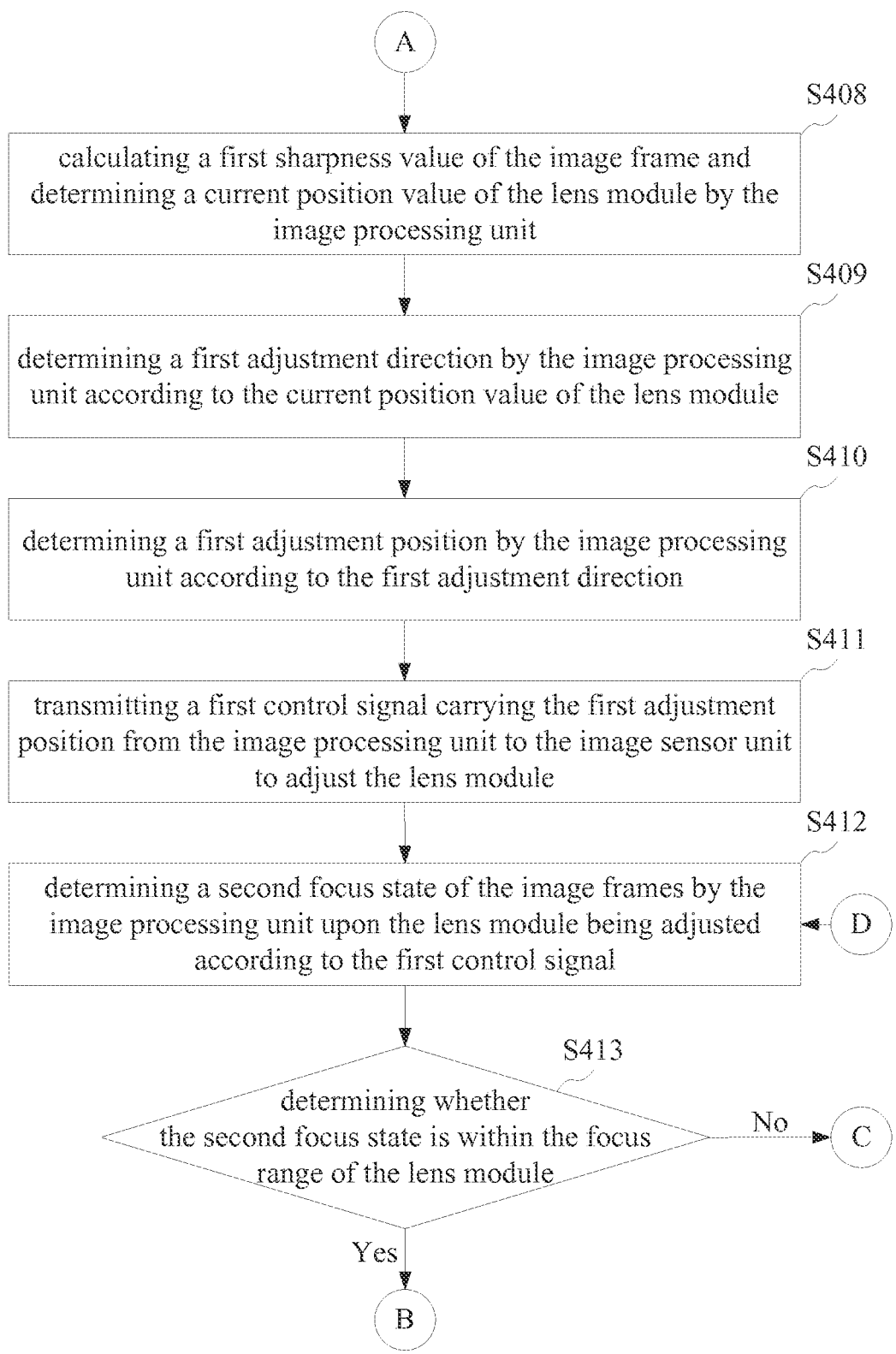
Figure 4C:
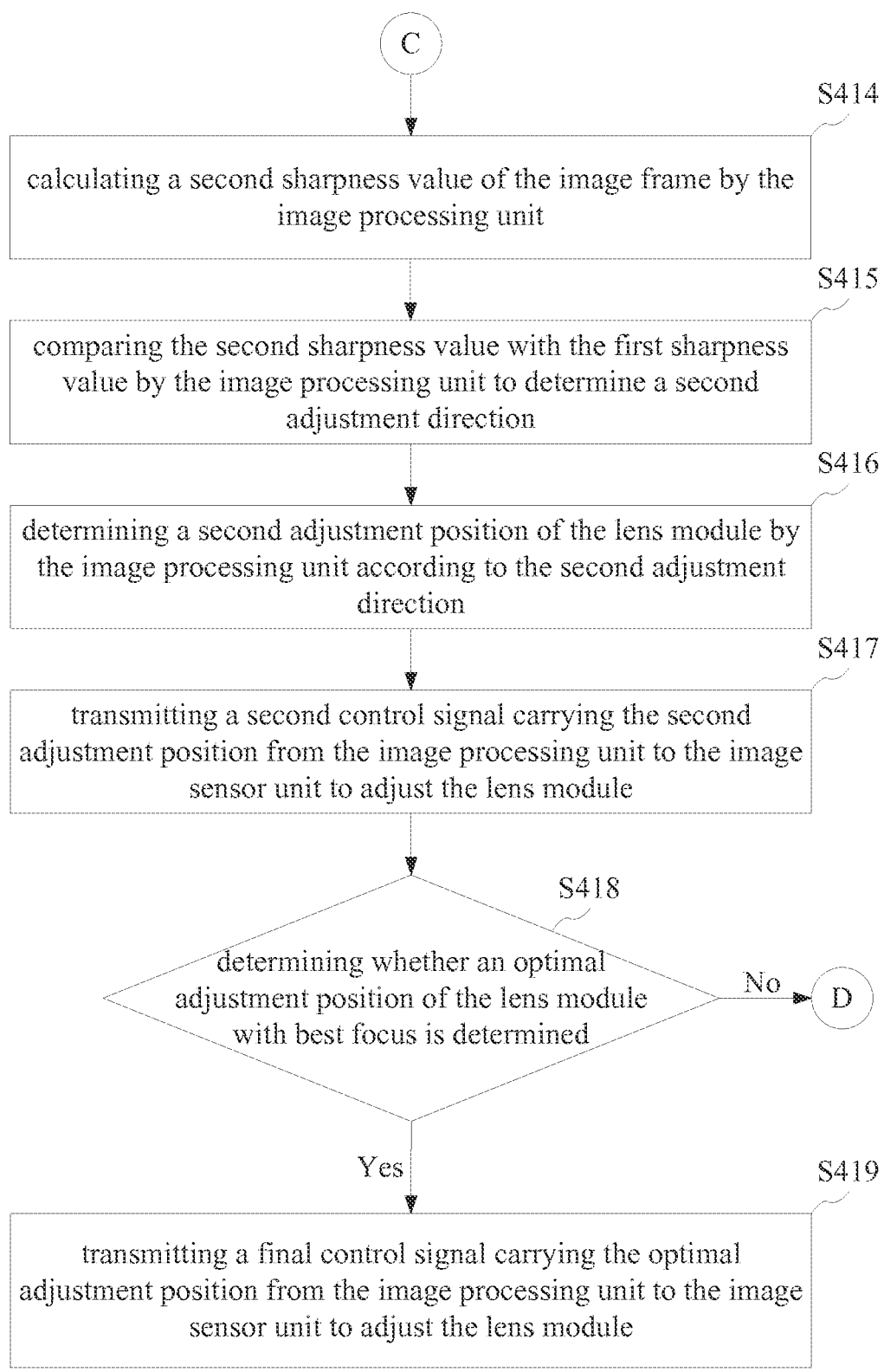

A third embodiment of the present invention is as shown in FIGS. 4A-4C, which depicts a focus adjustment method. The focus adjustment method of this embodiment can be applied in an electronic device electronic device which comprises an image sensor unit comprising at lease one lens module, a pre-processing unit coupled with the image sensor unit and an image processing unit coupled with the image sensor unit and the pre-processing unit, e.g., the electronic device 1 of the first embodiment.

As shown in FIGS. 4A-4C, step S401 is executed to capture a plurality of image frames of at least one scene by the image sensor unit. Step S402 is executed to process the image frames to provide focus information of the image frames by the pre-processing unit. In other embodiments, the Step S402 may further comprise the step of deriving the focus information from a predefined region of the image frames by the pre-processing unit according to predefined region information provided by the image processing unit.

Step S403 is executed to determine a focus change condition of the image frames by the image processing unit. Specifically, the focus change condition is determined as being satisfied in response to a variance of at least one predetermined characteristic value of at least two consecutive image frames of the image frames exceeding a predetermined threshold. For example, the predetermined characteristic value may be one of a brightness value, a motion value and a sharpness value, etc.

In other embodiments, the electronic device may further comprises a gravity sensor unit coupled with the image processing unit, and the focus change condition is determined as being satisfied in response to a variance of the gravity sensor values over a time period exceeding a gravity sensor value threshold.

Step S404 is executed to obtain a first focus state of one of the image frames by the image processing unit according to the focus information. Next, Step S405 is executed to determining whether the first focus state is within a focus range of the lens module or not.

If the first focus state is within a focus range of the lens module, Step S406 is executed to determine an optimal adjustment position of the lens module by the image processing unit according to a predetermined profile. Next, Step S407 is executed to transmit a final control signal carrying the optimal adjustment position from the image processing unit to the image sensor unit to adjust the lens module. After that, the focus adjustment method may be terminated.

Otherwise, if the first focus state is not within the focus range of the lens module, i.e., the first focus state is out of the focus range of the lens module, Step S408 is executed to calculate a first sharpness value of the image frame and determine a current position value of the lens module by the image processing unit. Next, Step S409 is executed to determine a first adjustment direction by the image processing unit according to the current position value of the lens module. The first adjustment direction can be determined according to the embodiment of FIG. 2. Step S410 is executed to determine the first adjustment position by the image processing unit according to the first adjustment position. The first adjustment position can be determined by moving the lens module to a position a predetermined step away from the current position of the lens module in the first adjustment direction. Step S411 is executed to transmit a first control signal carrying the first adjustment position from the image processing unit to the image sensor unit to adjust the lens module.

Specifically, in Step S409, the lens module is adjusted close to the scene in response to one of the following conditions: the current position value is larger than a far reference position value and the current position value lies within a range between a close reference position value and a central reference position value; and the lens module is adjusted away from the scene in response to one of the following conditions: the current position value is smaller than the close reference position value and the current position value lies within a range between the far reference position value and the central reference position value.

Step S412 is executed to determine a second focus state of the image frames by the image processing unit upon the lens module being adjusted according to the first control signal. Next, Step S413 is executed to determine whether the second focus state is within the focus range of the lens module or not. If the second focus state is within the focus range of the lens module, the Step S406 and Step S407 are executed again in order.

Otherwise, if the second focus state is out of the focus range of the lens module, Step S414 is executed to calculate a second sharpness value of the image frame by the image processing unit. Next, Step S415 is executed to compare the second sharpness value with the first sharpness value by the image processing unit to determine a second adjustment direction. Specifically, the second adjustment direction is the same as the first adjustment direction in response to the second sharpness value being larger than the first sharpness value, and the second adjustment direction is opposite to the first adjustment direction in response to the second sharpness value being smaller than the first sharpness value.

Step S416 is executed to determine a second adjustment position of the lens module by the image processing unit according to the second adjustment direction. Step S417 is executed to transmit a second control signal carrying the second adjustment position from the image processing unit to the image sensor unit to adjust the lens module.

Step S418 is executed to determine whether an optimal adjustment position of the lens module with best focus is determined or not. If yes, Step S418 is executed to transmit a final control signal carrying the optimal adjustment position from the image processing unit to the image sensor unit to adjust the lens module. After that, the focus adjustment method may be terminated.

If not, the Steps S412-S418 are execute again in order until an optimal adjustment position of the lens module with best focus is determined. That is, the image processing unit repeatedly adjusts the lens module of the image sensor unit in the same way until an optimal adjustment position of the lens module with best focus is determined.

In addition to the aforesaid steps, the focus adjustment method of this embodiment can also execute all the operations of the electronic device 1 and all the steps of the focus adjustment method set forth in the aforesaid embodiments and accomplish all the corresponding functions. The method in which the focus adjustment method of this embodiment executes these operations and accomplishes these functions can be readily appreciated by those of ordinary skill in the art based on the explanations of the aforesaid embodiments, and thus will not be further described herein.

Figure 5:
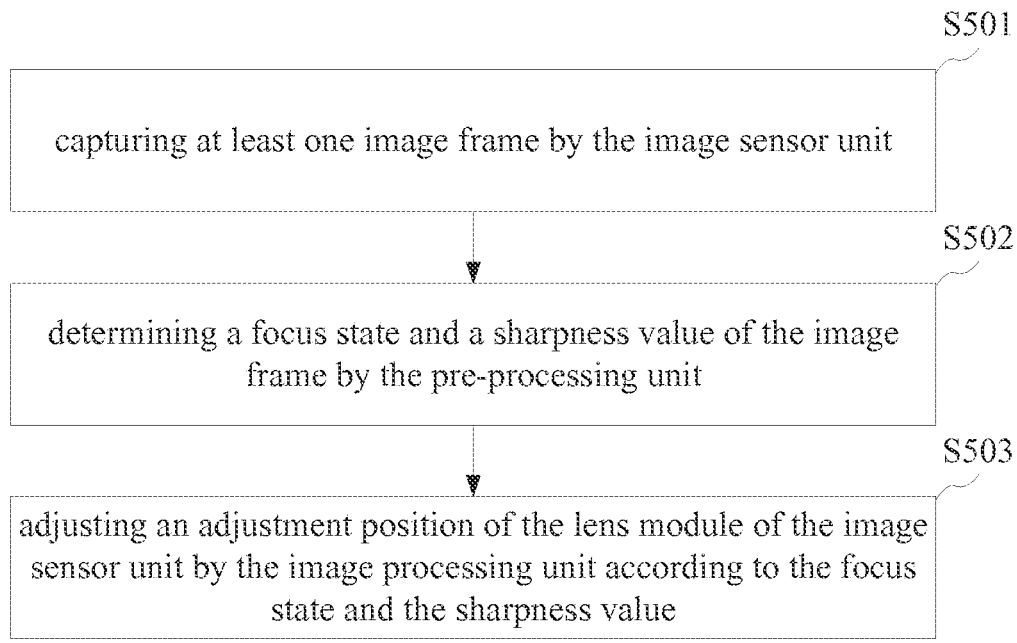
FIG. 5 is a flowchart diagram of a focus adjustment method according to a fourth embodiment of the present invention.

A fourth embodiment of the present invention is as shown in FIG. 5, which depicts a focus adjustment method. The focus adjustment method of this embodiment can be applied in an electronic device electronic device which comprises an image sensor unit comprising at lease one lens module, a pre-processing unit coupled with the image sensor unit and an image processing unit coupled with the image sensor unit and the pre-processing unit, e.g., the electronic device 1 of the first embodiment.

As shown in FIG. 5, Step S501 is executed to capture at least one image frame by the image sensor unit. Step S502 is executed to determine a focus state and a sharpness value of the image frame by the pre-processing unit. The focus state and the sharpness value may be determined in a raw image domain. Step S503 is executed to adjusting an adjustment position of the lens module of the image sensor unit by the image processing unit according to the focus state and the sharpness value.

In addition to the aforesaid steps, the focus adjustment method of this embodiment can also execute all the operations of the electronic device 1 and all the steps of the focus adjustment method set forth in the aforesaid embodiments and accomplish all the corresponding functions. The method in which the focus adjustment method of this embodiment executes these operations and accomplishes these functions can be readily appreciated by those of ordinary skill in the art based on the explanations of the aforesaid embodiments, and thus will not be further described herein.

Figure 6:
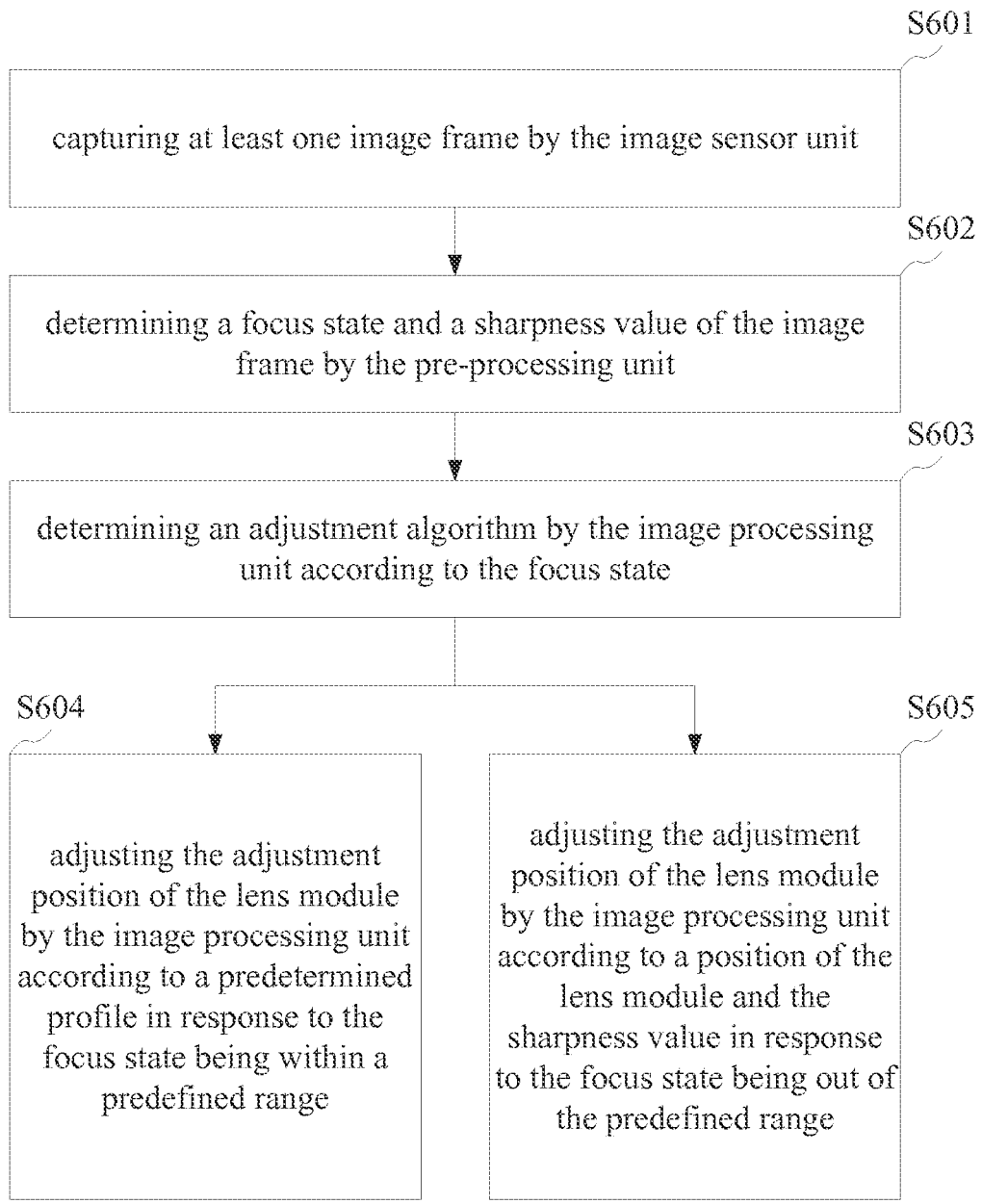
FIG. 6 is a flowchart diagram of a focus adjustment method according to a fifth embodiment of the present invention.

A fifth embodiment of the present invention is as shown in FIG. 6, which depicts a focus adjustment method. The focus adjustment method of this embodiment can be applied in an electronic device electronic device which comprises an image sensor unit comprising at lease one lens module, a pre-processing unit coupled with the image sensor unit and an image processing unit coupled with the image sensor unit and the pre-processing unit, e.g., the electronic device 1 of the first embodiment.

As shown in FIG. 6, Step S601 is executed to capture at least one image frame by the image sensor unit. Step S602 is executed to determine a focus state and a sharpness value of the image frame by the pre-processing unit. The focus state and the sharpness value may be determined in a raw image domain. Step S603 is executed to determine an adjustment algorithm by the image processing unit according to the focus state.

Step S604 is executed to adjust the adjustment position of the lens module by the image processing unit according to a predetermined profile in response to the focus state being within a predefined range. Step S605 is executed to adjust the adjustment position of the lens module by the image processing unit according to a position of the lens module and the sharpness value in response to the focus state being out of the predefined range.

In other embodiments, the Step S605 may further comprise the steps of: repeatedly adjusting the adjustment position of the lens module by the image processing unit according to a plurality of sharpness values of the image frame determined by the pre-processing unit; comparing the sharpness values by the image processing unit to obtain an optimal adjustment position of the lens module corresponding to the largest sharpness value of the sharpness values; and adjusting the adjustment position of the lens module to the optimal adjustment position by the image processing unit.

In addition to the aforesaid steps, the focus adjustment method of this embodiment can also execute all the operations of the electronic device 1 and all the steps of the focus adjustment method set forth in the aforesaid embodiments and accomplish all the corresponding functions. The method in which the focus adjustment method of this embodiment executes these operations and accomplishes these functions can be readily appreciated by those of ordinary skill in the art based on the explanations of the aforesaid embodiments, and thus will not be further described herein.

According to the above descriptions, the present invention provides an electronic device and a focus adjustment method thereof. The electronic device and the focus adjustment method thereof pre-process the image frames captured to provide focus information of the image frames and adjust the focus according to the focus information. Therefore, as the subject followed or the current scene is out of focus in response to movement of the electronic device, the electronic device and the focus adjustment method thereof can immediately obtain the change of focus via the focus information and effectively adjust the focus according to the focus information. Consequently, the present invention provides a better solution to the problem in which the conventional electronic devices can not effectively and immediately adjust the focus in response to the subject followed or the current scene being out of focus.

The above disclosure is related to the detailed technical contents and inventive features thereof. Persons skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An electronic device, comprising:
    an image sensor unit comprising at least one lens module, configured to capture a plurality of image frames with different scenes in response to movement of the electronic device;
    a pre-processing unit, coupled with the image sensor unit and configured to process the image frames to provide focus information of the image frames; and an image processing unit, coupled with the image sensor unit and the pre-processing unit and configured to analyze scene change among the image frames to determine a focus change condition of the image frames, determine whether focus of one of the image frames needs to be adjusted according to the focus change condition, and start to adjust the focus by adjusting the lens module according to the focus information when the focus change condition is determined to be satisfied.

2. The electronic device as claimed in claim 1, wherein the pre-processing unit derives the focus information from a predefined region of the image frames according to predefined region information provided by the image processing unit.

3. The electronic device as claimed in claim 1, wherein the focus change condition is determined as being satisfied in response to a variance of at least one predetermined characteristic value of at least two consecutive image frames of the image frames exceeding a predetermined threshold, and the predetermined characteristic value is one of a brightness value, a motion value and a sharpness value.

4. The electronic device as claimed in claim 1, further comprising a gravity sensor unit coupled with the image processing unit, the gravity sensor unit being configured to provide gravity sensor values, wherein the focus change condition is determined as being satisfied in response to a variance of the gravity sensor values over a time period exceeding a gravity sensor value threshold.

5. The electronic device as claimed in claim 1, wherein the image processing unit is further configured to:
    obtain a first focus state of one of the image frames according to the focus information;
    determine a first adjustment position of the lens module according to the first focus state; and
    transmit a first control signal carrying the first adjustment position to the image sensor unit to adjust the lens module.

6. The electronic device as claimed in claim 5, wherein the image processing unit is further configured to:
    calculate a first sharpness value of the image frame and determining a current position value of the lens module in response to the first focus state being out of a focus range of the lens module;
    determine a first adjustment direction according to the current position value of the lens module; and
    determine the first adjustment position of the lens module according to the first adjustment direction.

7. The electronic device as claimed in claim 6, wherein the lens module is adjusted close to the scene in response to one of the following conditions: the current position value is larger than a far reference position value and the current position value lies within a range between a close reference position value and a central reference position value; and the lens module is adjusted away from the scene in response to one of the following conditions: the current position value is smaller than the close reference position value and the current position value lies within a range between the far reference position value and the central reference position value.

8. The electronic device as claimed in claim 6, wherein the image processing unit is further configured to:
- determine a second focus state of the image frames upon the lens module being adjusted according to the first control signal;
- calculate a second sharpness value of the image frame in response to the second focus state being out of the focus range of the lens module;
- compare the second sharpness value with the first sharpness value to determine a second adjustment direction;
- determine a second adjustment position of the lens module according to the second adjustment direction; and
- transmit a second control signal carrying the second adjustment position to the image sensor unit to adjust the lens module.

9. The electronic device as claimed in claim 8, wherein the second adjustment direction is the same as the first adjustment direction in response to the second sharpness value being larger than the first sharpness value, and the second adjustment direction is opposite to the first adjustment direction in response to the second sharpness value being smaller than the first sharpness value.

10. The electronic device as claimed in claim 8, wherein the image processing unit is further configured to repeatedly adjust the lens module of the image sensor unit in the same way until an optimal adjustment position of the lens module with best focus is determined.

11. A focus adjustment method for use in an electronic device, the electronic device comprising an image sensor unit comprising at least one lens module, a pre-processing unit coupled with the image sensor unit and an image processing unit coupled with the image sensor unit and the pre-processing unit, the focus adjustment method comprising the following steps of:
- (a) capturing a plurality of image frames with different scenes in response to movement of the electronic device by the image sensor unit;
- (b) processing the image frames to provide focus information of the image frames by the pre-processing unit;
- (c) analyzing scene change among the image frames to determine a focus change condition of the image frames by the image processing unit; and
- (d) determining whether focus of one of the image frames needs to be adjusted according to the focus change condition by the image processing unit and starting to adjust the focus by adjusting the lens module by the image processing unit according to the focus information when the focus change condition is determined to be satisfied.

12. The focus adjustment method as claimed in claim 11, wherein the step (b) further comprises the following step of:
- (b1) deriving the focus information from a predefined region of the image frames by the pre-processing unit according to predefined region information provided by the image processing unit.

13. The focus adjustment method as claimed in claim 11, wherein the focus change condition is determined as being satisfied in response to a variance of at least one predetermined characteristic value of at least two consecutive image frames of the image frames exceeding a predetermined threshold, and the predetermined characteristic value is one of a brightness value, a motion value and a sharpness value.

14. The focus adjustment method as claimed in claim 11, wherein the electronic device further comprises a gravity sensor unit coupled with the image processing unit, and the focus change condition is determined as being satisfied in response to a variance of gravity sensor values provided by the gravity sensor unit over a time period exceeding a gravity sensor value threshold.

15. The focus adjustment method as claimed in claim 11, wherein the step (d) further comprises the following steps of:
- (d1) obtaining a first focus state of one of the image frames by the image processing unit according to the focus information;
- (d2) determining a first adjustment position of the lens module by the image processing unit according to the first focus state; and
- (d3) transmitting a first control signal carrying the first adjustment position from the image processing unit to the image sensor unit to adjust the lens module.

16. The focus adjustment method as claimed in claim 15, wherein the step (d2) further comprises the following steps:
- (d21) calculating a first sharpness value of the image frame and determining a current position value of the lens module by the image processing unit in response to the first focus state being out of a focus range of the lens module;
- (d22) determining a first adjustment direction by the image processing unit according to the current position of the lens module value; and
- (d23) determining the first adjustment position by the image processing unit according to the first adjustment position.

17. The focus adjustment method as claimed in claim 16, wherein the lens module is adjusted close to the scene in response to one of the following conditions: the current position value is larger than a far reference position value and the current position value lies within a range between a close reference position value and a central reference position value; and the lens module is adjusted away from the scene in response to one of the following conditions: the current position value is smaller than the close reference position value and the current position value lies within a range between the far reference position value and the central reference position value.

18. The focus adjustment method as claimed in claim 16, further comprising the following steps of:
- (d4) determining a second focus state of the image frames by the image processing unit upon the lens module being adjusted according to the first control signal;
- (d5) calculating a second sharpness value of the image frame by the image processing unit in response to the second focus state being out of the focus range of the lens module;
- (d6) comparing the second sharpness value with the first sharpness value by the image processing unit to determine a second adjustment direction;
- (d7) determine a second adjustment position of the lens module by the image processing unit according to the second adjustment direction; and
- (d8) transmitting a second control signal carrying the second adjustment position from the image processing unit to the image sensor unit to adjust the lens module.

19. The focus adjustment method as claimed in claim 18, wherein the second adjustment direction is the same as the first adjustment direction in response to the second sharpness value being larger than the first sharpness value, and the second adjustment direction is opposite to the first adjustment direction in response to the second sharpness value being smaller than the first sharpness value.

20. The focus adjustment method as claimed in claim 18, further comprising the following step of:
- (d9) repeatedly adjusting the lens module of the image sensor unit in the same way by the image processing unit until an optimal adjustment position of the lens module with best focus is determined.

21. A focus adjustment method for use in an electronic device, the focus adjustment method comprising the following steps of:
- (a) capturing a plurality of image frames with different scenes in response to movement of the electronic device by an image sensor unit;
- (a1) analyzing scene change among the image frames to determine a focus change condition of the image frames by an image processing unit;
- (b) determining a focus state and a sharpness value of one of the image frames by a pre-processing unit; and
- (c) determining whether focus of the image frame needs to be adjusted according to the focus change condition by the image processing unit and starting to adjust the focus by adjusting an adjustment position of a lens module of the image sensor unit by the image processing unit according to the focus state and the sharpness value.

22. The focus adjustment method as claimed in claim 21, wherein the focus state and the sharpness value are determined in a raw image domain.

23. The focus adjustment method as claimed in claim 21, wherein the step (c) further comprises the following steps of:
- (c1) determining an adjustment algorithm by the image processing unit according to the focus state;
- (c2) adjusting the adjustment position of the lens module by the image processing unit according to a predetermined profile in response to the focus state being within a predefined range; and
- (c3) adjusting the adjustment position of the lens module by the image processing unit according to a position of the lens module and the sharpness value in response to the focus state being out of the predefined range.

24. The focus adjustment method as claimed in claim 21, wherein the step (c3) further comprises the following steps of:
- (c31) repeatedly adjusting the adjustment position of the lens module by the image processing unit according to a plurality of sharpness values of the image frame determined by the pre-processing unit;
- (c32) comparing the sharpness values by the image processing unit to obtain an optimal adjustment position of the lens module corresponding to the largest sharpness value of the sharpness values; and
- (c33) adjusting the adjustment position of the lens module to the optimal adjustment position by the image processing unit.

* * * * *